United States Patent
Hwang

(10) Patent No.: US 8,245,751 B2
(45) Date of Patent: Aug. 21, 2012

(54) SUBSTRATE BONDING APPARATUS

(75) Inventor: Jae Seok Hwang, Seongnam-si (KR)

(73) Assignee: Advanced Display Process Engineering Co., Ltd., Seongnam-si (KR)

( * ) Notice: Subject to any disclaimer, the term of this patent is extended or adjusted under 35 U.S.C. 154(b) by 187 days.

(21) Appl. No.: 12/260,529

(22) Filed: Oct. 29, 2008

(65) Prior Publication Data

US 2009/0114348 A1  May 7, 2009

(30) Foreign Application Priority Data

Nov. 7, 2007 (KR) .................. 10-2007-0113178
Jun. 2, 2008 (KR) .................. 10-2008-0051493

(51) Int. Cl.
*B32B 37/10* (2006.01)
(52) U.S. Cl. .......... 156/536; 156/391; 156/538; 156/580
(58) Field of Classification Search .................. 156/391, 156/538, 580, 584, 536
See application file for complete search history.

(56) References Cited

U.S. PATENT DOCUMENTS

| | | | | |
|---|---|---|---|---|
| 5,964,978 | A * | 10/1999 | Hirooka .................. | 156/299 |
| 6,793,756 | B2 * | 9/2004 | Lee et al. .................. | 156/228 |
| 7,436,483 | B2 * | 10/2008 | Byun et al. .................. | 349/187 |
| 7,921,895 | B2 * | 4/2011 | Shim .................. | 156/499 |
| 2005/0231886 | A1 | 10/2005 | Chiang et al. | |

FOREIGN PATENT DOCUMENTS

| | | |
|---|---|---|
| JP | 09-014294 | 1/1997 |
| JP | 2003-330031 | 11/2003 |
| JP | 2007/183543 | 7/2007 |
| TW | 200606501 | 2/2006 |
| TW | 200628880 | 8/2006 |
| TW | M330165 | 4/2008 |
| WO | WO 2006/046379 | 5/2006 |

OTHER PUBLICATIONS

Office Action issued in TW Application No. 097142683 dated Jul. 18, 2011 (full Chinese text and full English translation).
Japanese Office Action issued in JP Application No. 2009-015004 dated Jun. 18, 2012.

* cited by examiner

*Primary Examiner* — Khanh P Nguyen
*Assistant Examiner* — Margaret Squalls
(74) *Attorney, Agent, or Firm* — KED & Associates, LLP

(57) ABSTRACT

A substrate bonding apparatus and method are provided. The substrate bonding apparatus may include a board having a receiving surface opposite to a substrate fixed at one side thereof, a plurality of chucking members located between the receiving surface of the board and the substrate, and a substrate separation device to separate the substrate from the chucking members. The substrate separation device includes a pusher for pushing the substrate to separate the substrate from the chucking members, and a base plate installed at the receiving surface of the board, the base plate having an installation space to install the pusher formed therein. The pusher protrudes out of the base plate through an inlet and outlet port located at one end of the installation space to pressurize the substrate.

9 Claims, 12 Drawing Sheets

SUBSTRATE BONDING APPARATUS

BACKGROUND

1. Field

A substrate bonding apparatus is provided, and more particularly, a substrate bonding apparatus including a substrate separation device is provided.

2. Background

With the development of an information technology based society, demands for display devices have increased. Various flat display devices, such as liquid crystal displays (LCD), plasma display panels (PDP), electro luminescent displays (ELD), and vacuum fluorescent displays (VFD), have been developed. Among them, the LCD has excellent image quality, is light and thin, and is operable with low power consumption, as compared to older technology cathode ray tubes (CRT. Improvements in associated manufacturing technology would help make LCDs more widely applicable.

BRIEF DESCRIPTION OF THE DRAWINGS

The embodiments will be described in detail with reference to the following drawings in which like reference numerals refer to like elements wherein.

DETAILED DESCRIPTION

Hereinafter, exemplary embodiments will be described in more detail with reference to FIGS. 1 to 15. Embodiments may be modified in various forms, and therefore, scope should not be interpreted to be limited by embodiments as broadly described herein.

An LCD panel may be manufactured by injecting a liquid crystal between a thin film transistor ('TFT') substrate having an electrode formed thereon and a color filter (CF) substrate having a fluorescent substance applied thereto. A sealant may be applied to the outer circumference of the substrates to prevent the leakage of the liquid crystal. Spacers may be provided between the substrates to maintain a predetermined distance between the substrate.

In order to manufacture an LCD, first a process for separately preparing the TFT substrate and the CF substrate may be performed, then a process for bonding the substrates, and then a process for injecting a liquid crystal material into a space defined between the substrates. The process for bonding the substrates is important in determining the quality of the LCD.

The substrate bonding process may be carried out by a substrate bonding apparatus including an upper chamber and a lower chamber that form a bonding space in which a vacuum is created and the process is carried out. The substrate bonding apparatus may pressurize the TFT substrate and the CF substrates to bond the substrates. To this end, the substrate bonding apparatus may include two electrostatic chucks (ESC) disposed vertically opposite to each other. The TFT substrate and the CF substrate may be held by the respective electrostatic chucks. At the time of bonding the substrates, the electrostatic chucks may be moved toward each other, while parallelism between the electrostatic chucks is precisely maintained, such that the substrates are bonded to each other.

Figure 1:
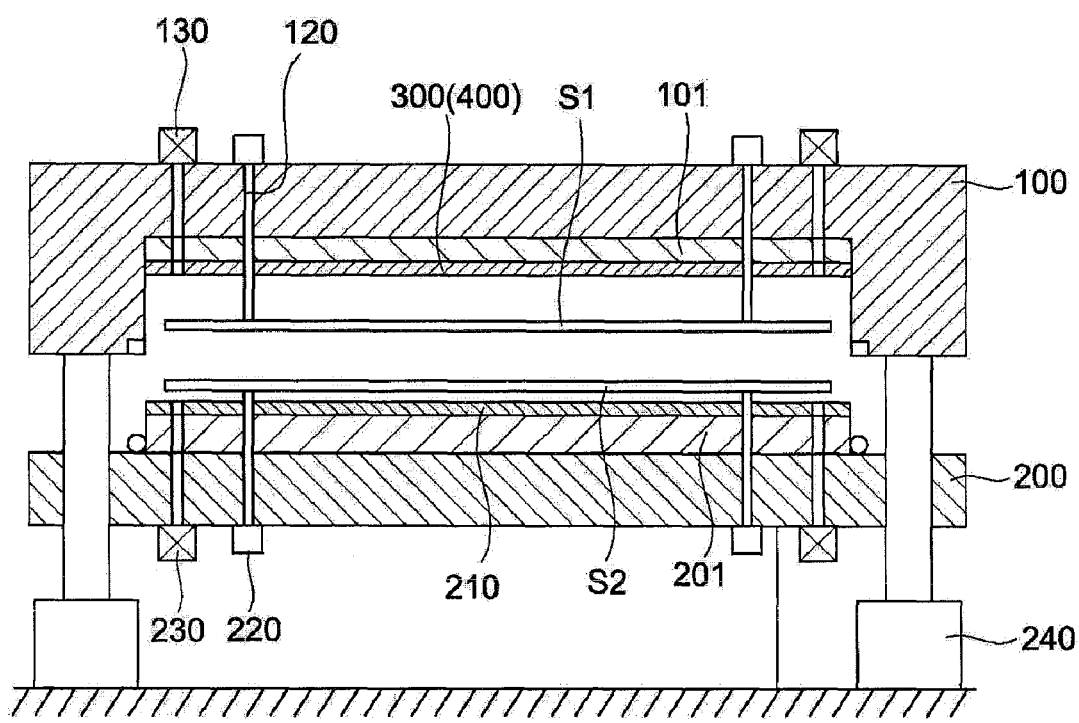
FIG. 1 is a sectional view of a substrate bonding apparatus as embodied and broadly described herein.

The substrate bonding apparatus shown in FIG. 1 may include a first chamber 100 that receives a first substrate S1 and a second chamber 200 that receives a second substrate S2. The second chamber 200 may be fixed to a base, and the first chamber 100 may be moved upward or downward by a movement device 240.

The first chamber 100 may be provided with a first substrate chuck 300 to hold the first substrate S1, and the second chamber 200 may be provided with a second substrate chuck 210 to hold the second substrate S2. The first substrate chuck 300 and the second substrate chuck 210 may be installed at a first board 101 of the first chamber 100 and a second board 201 of the second chamber 200, respectively. The first substrate chuck 300 may use a Van der Waals' force to hold the first substrate P1, and the second substrate chuck 210 may hold the second substrate P2 using an electrostatic force. Other means may also be appropriate.

Figure 2:
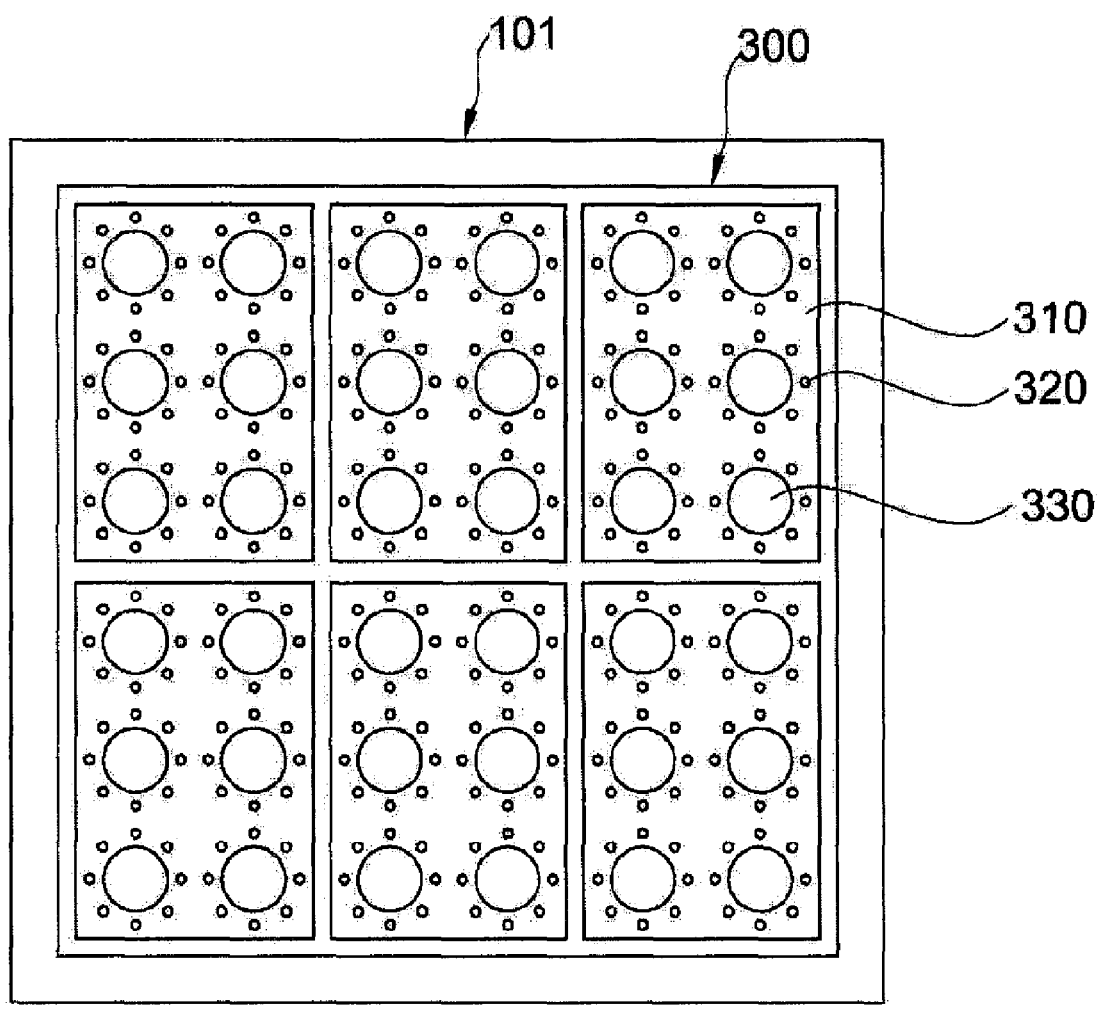
FIG. 2 is a plan view of an arrangement of a substrate chuck on a board included in the substrate bonding apparatus shown in FIG. 1.

FIG. 2 is a plan view of the first substrate chuck 300. As shown in FIG. 2, the first substrate chuck 300 may be installed at the first board 101. The first substrate chuck 300 may include a base plate 310, a plurality of adhesives 320 disposed at the surface of the base plate 310 in an exposed fashion, and substrate separation devices 330 disposed between the adhesives 320 to separate the first substrate S1, attached to the adhesives 320, from the adhesives 320 as necessary.

In certain embodiments, a plurality of first substrate chucks 300 may be installed on the first board 101 depending upon the size of the first substrate S1 and the size of the first board 101.

Figure 3:
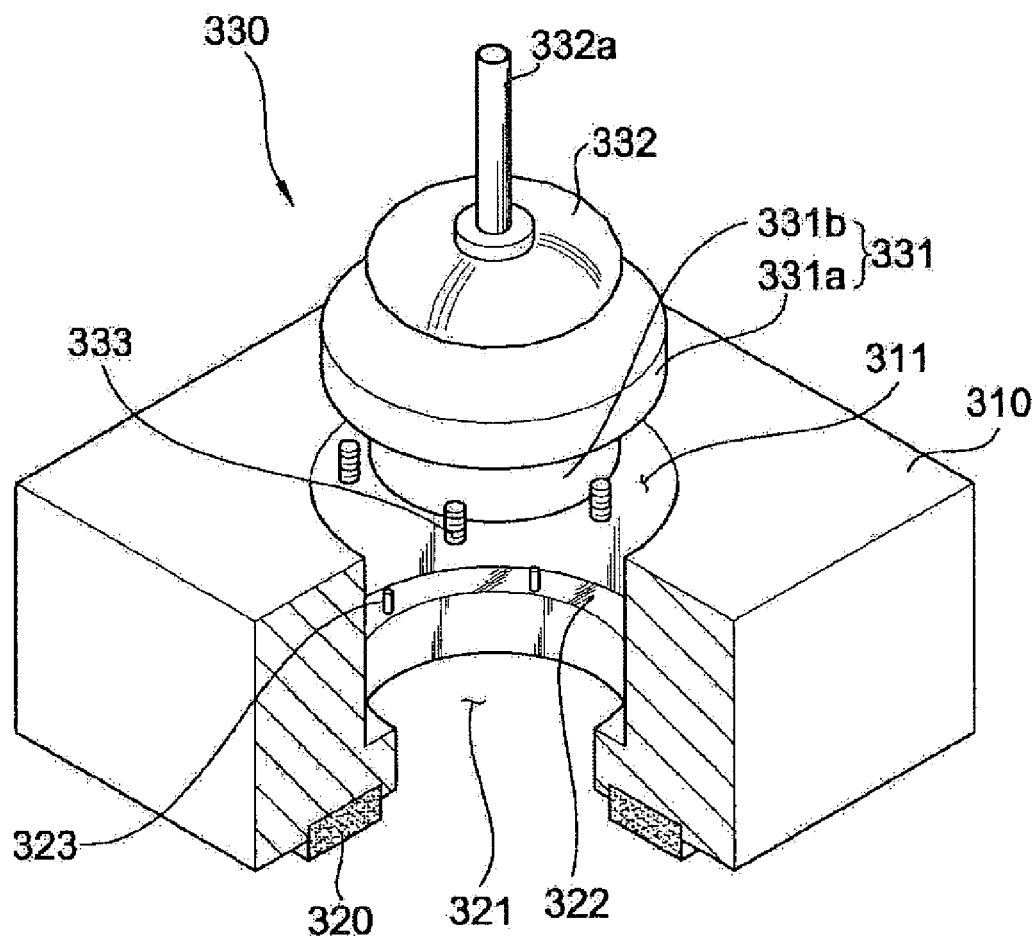
FIG. 3 is a partial cutaway perspective view of a substrate chuck in accordance with an embodiment as broadly described herein.
Figure 4:
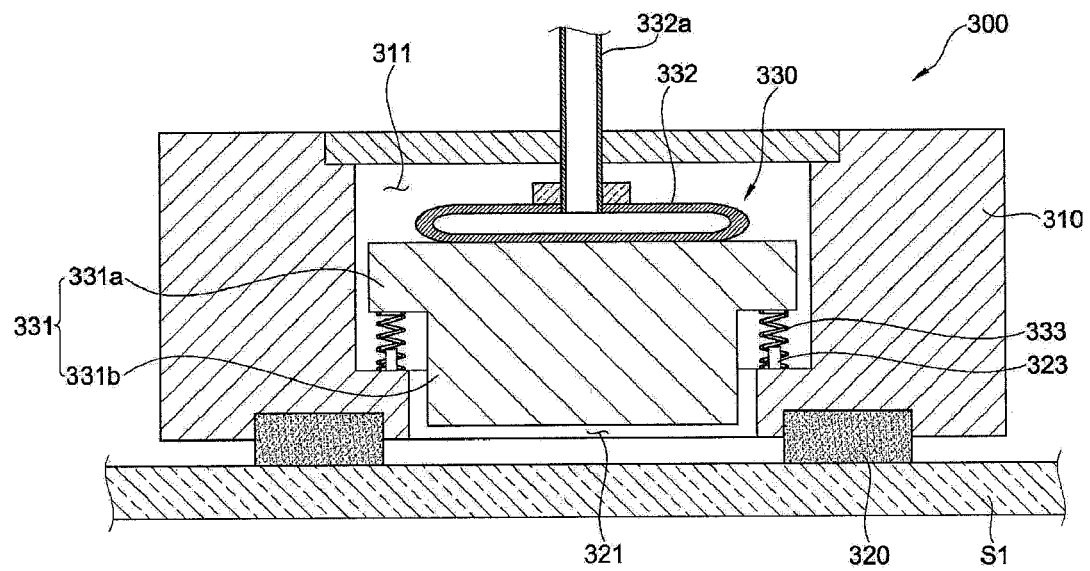
FIGS. 4 and 5 are illustrate operation of the substrate chuck shown in FIG. 3.
Figure 5:
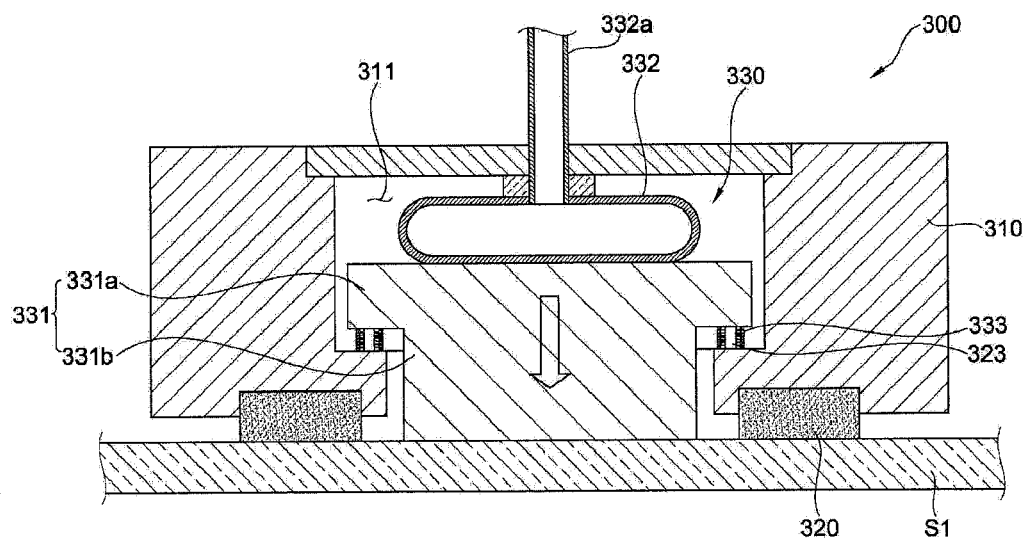

Hereinafter, various embodiments of the first substrate chuck 300 will be described. FIG. 3 is a partial cutaway perspective view of a first embodiment of the first substrate chuck, and FIGS. 4 and 5 illustrate operation of the first substrate chuck according to the first embodiment.

As shown in FIG. 3, the first substrate chuck 300 may include a base plate 310 made of metal. The base plate 310 may be provided with an installation space 311 having an inlet and outlet port 321 formed at the lower part thereof. A step part 322 may be formed at the lower inside portion of the installation space 311. Around the inlet and outlet port 321 of the base plate 310, a plurality of adhesives 320 may be arranged to hold first substrate S1.

A substrate separation device 330 may be installed in the installation space 311. The substrate separation device 330 may include a pusher 331 including a support part 331a located in the installation space 311 such that the support part 331a engages with the step part 322 of the installation space 311, and a push part 331b having a diameter less than that of the support part 331a.

The substrate separation device 330 may also include a diaphragm 332 to urge the push part 331b of the pusher 331 to protrude toward the inlet and outlet port 321, and springs 333 interposed between the support part 331a of the pusher 331 and the step part 322 of the installation space 311 to elastically restore the pusher 331 into the installation space 311. Support protrusions 323 may be formed at the step part 322 to support the springs 333. The diaphragm 332, located on the pusher 331, may expand or contract in response to pneumatic pressure. At the top of the diaphragm 332, an air pipe 332a may supply pneumatic pressure to the diaphragm 332. The air pipe 332a may extend outward from the base plate 310.

The operation of the first substrate chuck 300 shown in FIG. 3 will be described with reference to FIGS. 4 and 5. When the first substrate S1 is held by the adhesives 320, as shown in FIG. 4, the pusher 331 is held in the installation space 311 by the springs 333. At this time, pneumatic pressure is not applied to the diaphragm 332.

When the first substrate S1 is to be separated from the first chuck 300 for bonding, as shown in FIG. 5, pneumatic pressure is applied to the diaphragm 332, causing the diaphragm 332 to expand.

With the expansion of the diaphragm 332, the push part 331b of the pusher 331 is urged toward the inlet and outlet port 321 and the springs 333 are compressed. Consequently, the push part 331b of the pusher 331 advances toward the first substrate S1 through the inlet and outlet port 321, and pushes the first substrate S1 in the direction opposite to the direction in which the first substrate S1 is held by the adhesives 320. As a result of the pushing operation, the first substrate S1 is separated from the adhesives 320. Once the first substrate S1 is separated, pressure may be released from the diaphragm 332, and a restoring force of the springs 333 retract the pusher 331 back into the installation space 311.

Figure 6:
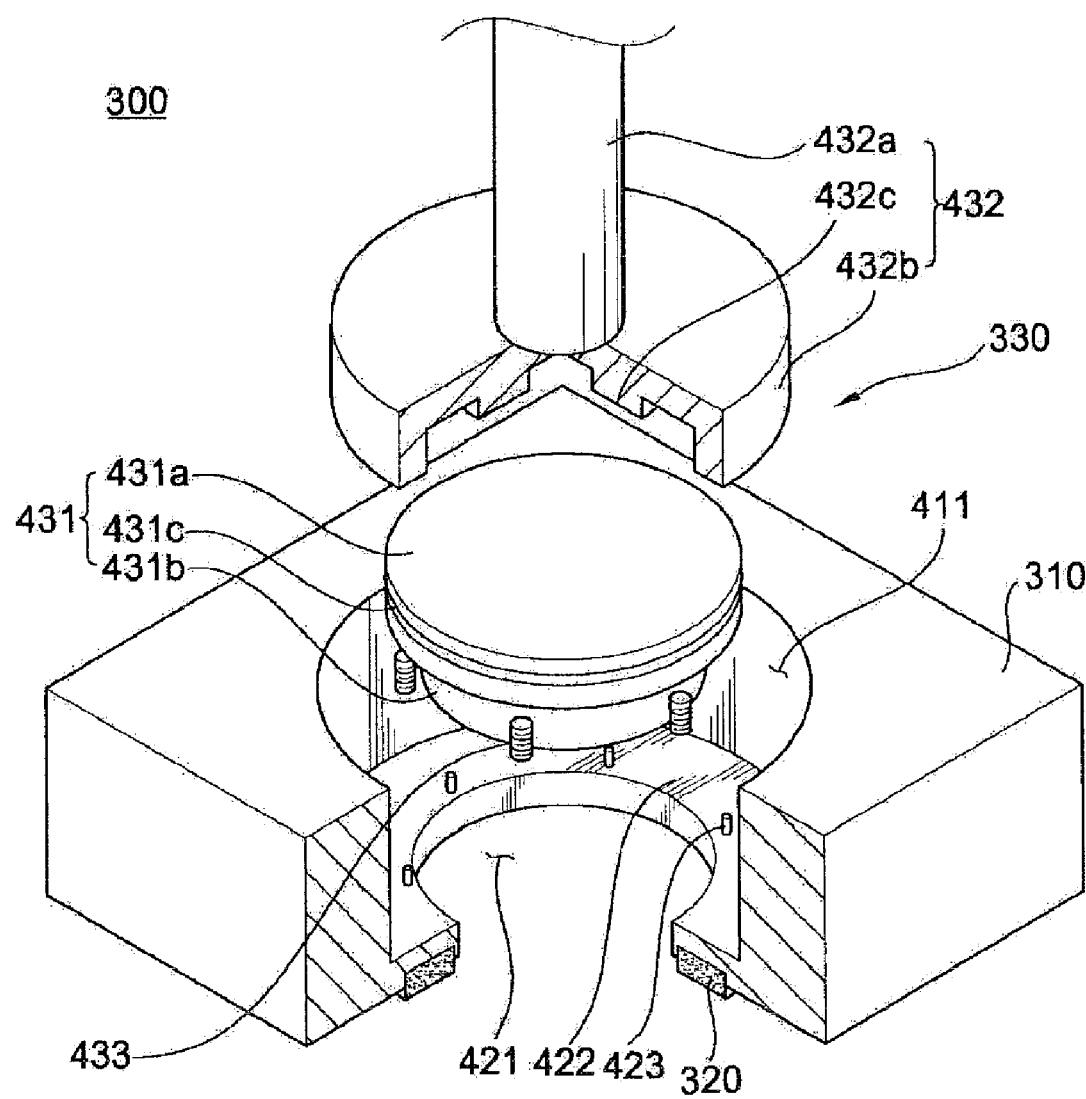
FIG. 6 is a partial cutaway perspective view of a substrate chuck in accordance with an embodiment as broadly described herein.
Figure 7:
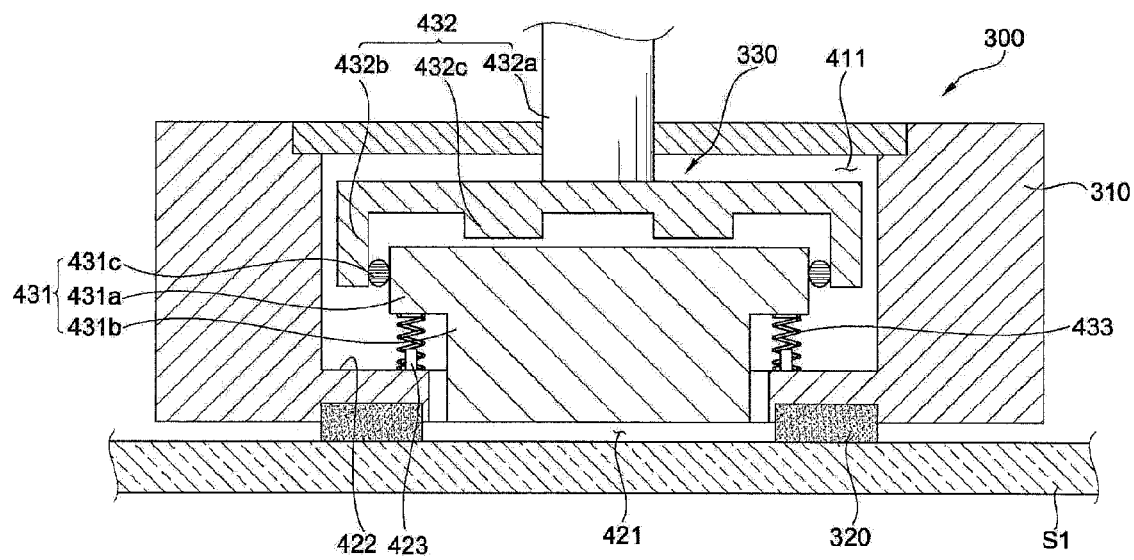
FIGS. 7 and 8 illustrate operation of the substrate chuck shown in FIG. 6.
Figure 8:
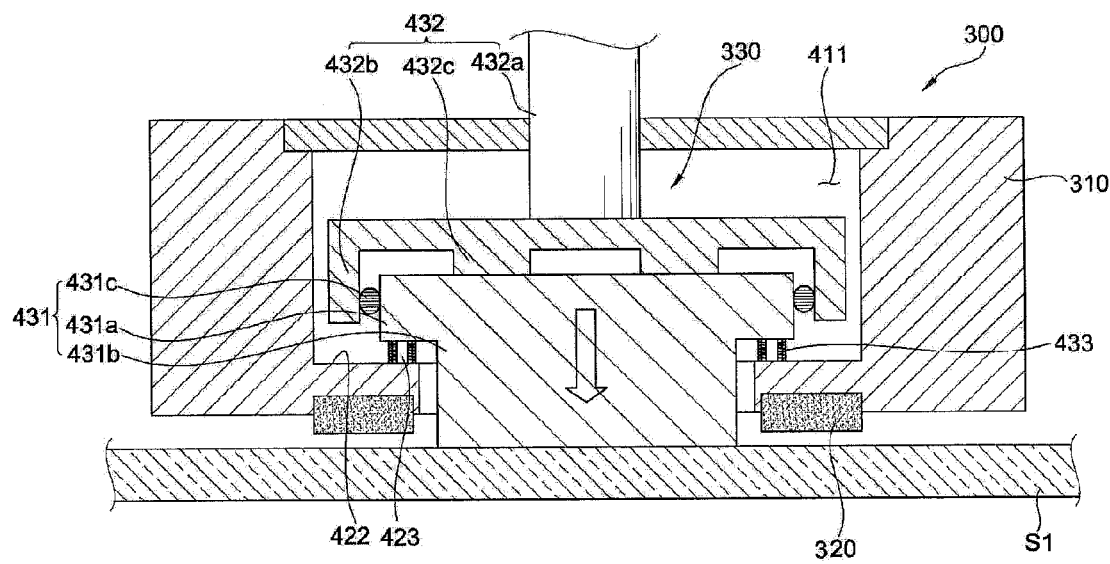

FIG. 6 is a partial cutaway perspective view of a second embodiment of the first substrate chuck, and FIGS. 7 and 8 illustrate operation of the first substrate chuck according to the second embodiment.

As shown in FIG. 6, the first substrate chuck 300 may include a base plate 310 made of metal. The base plate 310 may be provided with an installation space 411 having an inlet and outlet port 421 formed at the lower part thereof. A step part 422 may be formed at the lower inside of the installation space 411. Around the inlet and outlet port 421 of the base plate 310, a plurality of adhesives 320 may be provided to hold first substrate S1.

A substrate separation device 330 may be installed in the installation space 411. The substrate separation device 330 may include a pusher 431 including a support part 431a located in the installation space 411 such that the support part 431a engages with the step part 422 of the installation space 411, and a push part 431b having a diameter less than the support part 431a.

The substrate separation device 330 may also include a piston 432 to urge the push part 431b of the pusher 431 to protrude through the inlet and outlet port 421, and springs 433 interposed between the support part 431a of the pusher 431 and the step part 422 of the installation space 411 to elastically restore the pusher 431 into the installation space 411. Support protrusions 423 may be formed at the step part 422 to support the springs 433.

The piston 432 of the substrate separation device 330 may include a piston rod 432a and a cover 432b to cover the top and the side of the pusher 431. At the inside of the cover 432b, a push protrusion 432c may contact the top of the pusher 431. At the side of the support part 431a of the pusher 431, an O-ring 431c may be provided. A plurality of the adhesives 320 may be located around the inlet and outlet port 421.

The operation of the substrate separation device 330 shown in FIG. 6 will be described with reference to FIGS. 7 and 8. When the first substrate S1 is held by the adhesives 320, as shown in FIG. 7, the pusher 431 is positioned in the installation space 411, the springs 433 are at rest, and the piston 431 is raised.

When the first substrate S1 is to be separated from the first chuck 300 for bonding, as shown in FIG. 8, the piston 432 is lowered. With the downward movement of the piston 432, the push part 431b of the pusher 431 is urged through the inlet and outlet port 421 and the springs 433 are compressed. Consequently, the push part 431b of the pusher 431 advances toward the first substrate S1 through the inlet and outlet port 421, and pushes the first substrate S1 in the direction opposite to the direction in which the first substrate S1 is held by the adhesives 320. As a result of the pushing operation, the first substrate S1 may be separated from the adhesives 320.

Hereinafter, the operation of the substrate bonding apparatus shown in FIG. 1 will be discussed.

While the first chamber 100 and the second chamber 200 are spaced apart from each other, a robot (not shown) supplies a first substrate S1 into a space defined between the first chamber 100 and the second chamber 200. Subsequently, a vacuum chuck 120 provided at the first chamber 100 is lowered to suction and raise the first substrate S1. As the first substrate S1 rises in response to the suction of the vacuum chuck 120, the first substrate P1 is attached to the adhesives 320 or the first board 101.

The robot then supplies a second substrate S2 into the space defined between the first chamber 100 and the second chamber 200. A pin 220 or pins 220 are raised to receive the second substrate S2. While the second substrate S2 is supported by the pins 220, the robot retreats from the substrate bonding apparatus. Subsequently, the pins 220 are lowered to locate the second substrate S2 on the second board 201. At this time, the second substrate S2 is attached to the second substrate chuck 210.

Subsequently, the first chamber 100 is lowered by the movement device 240, with the result that the first chamber 100 is brought into tight contact with the second chamber 200 to define a process space between the first chamber 100 and the second chamber 200. After the process space is defined, a vacuum is created in the process space by a dry pump and a high-vacuum molecular pump, or other system as appropriate. At this time, the first board 101 is lowered to roughly align the first substrate S1 and the second substrate S2. After the rough alignment of the first substrate S1 and the second substrate S2 is completed, fine alignment is carried out between the first substrate S1 and the second substrate S2. After the fine alignment of the first substrate S1 and the second substrate S2 is completed, the alignment process is finished.

After finishing the alignment process, a vacuum is created in the space defined between the chambers 100 and 200, with the result that the first substrate S1 is in close proximity to the second substrate S2. Subsequently, the first substrate S1 is separated from the adhesives 320 by the substrate separation device 330, and then drops to the second substrate S2, which is located below the first substrate S1, so that the first substrate S1 is bonded to the second substrate S2.

When the first substrate S1 is bonded to the second substrate S2, the space defined between the chambers 100 and 200 is ventilated such that the space is under atmospheric pressure conditions. At this time, although not shown, an N2 gas is supplied from the first chamber 100 side to more securely bond the first substrate S1 and the second substrate S2.

When the above-described process is completed, the first chamber 100 and the second chamber 200 are moved apart from each other, the pins 220 of the second chamber 200 are raised, and the robot enters the space defined between the first chamber 100 and the second chamber 200 to withdraw the bonded panel from the substrate bonding apparatus. In this way, the substrate bonding process is completed.

Figure 9:
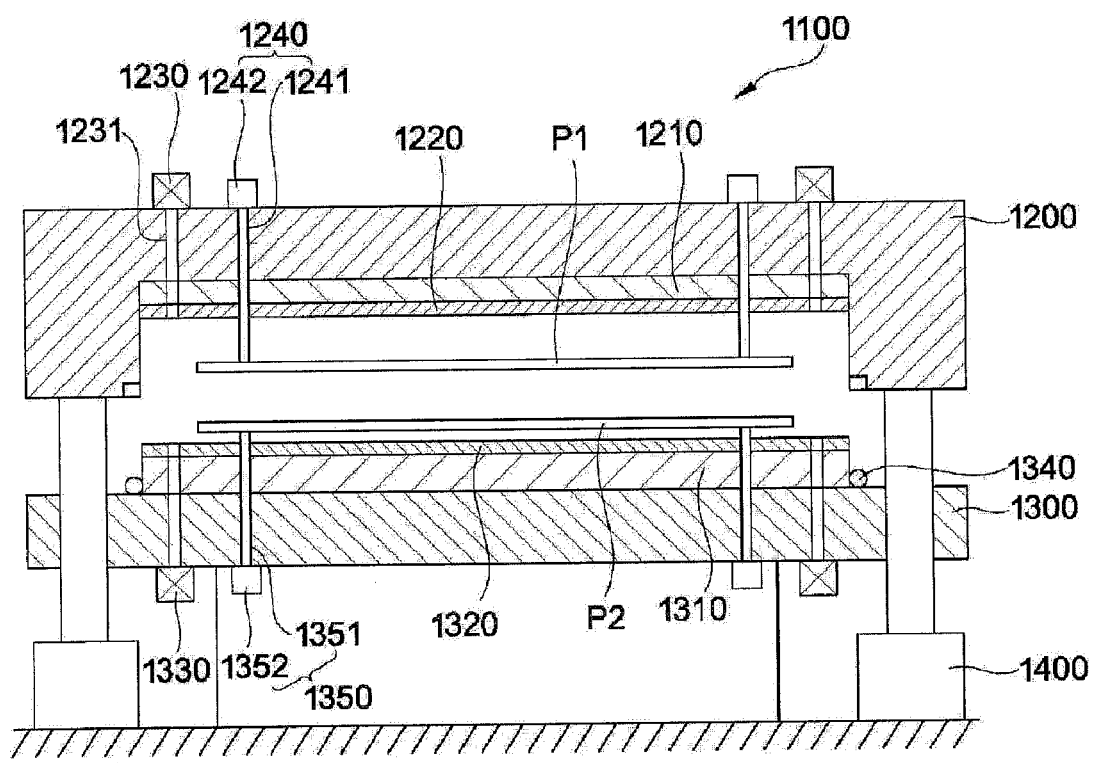
FIG. 9 is a sectional view of a substrate bonding apparatus in accordance with another embodiment as broadly described herein.

FIG. 9 is a schematic sectional view of a substrate bonding apparatus 1100 according to another embodiment as broadly described herein including an upper chamber 1200, a lower chamber 1300, and a driver 1400. The upper chamber 1200 may be moved upward or downward by the driver 1400 so as to bring the bottom of the upper chamber 1200 into tight contact with the lower chamber 1300 and define a bonding space therebetween. An upper board 1210 formed as a plate may be provided at the bottom of the upper chamber 1200, and an upper chuck 1220 may be attached to the bottom of the upper board 1210. A first substrate P1 may be attached to the bottom of the upper chuck 1220. The upper chuck 1220 may be an electrostatic chuck (ESC) that holds the first substrate P1 using an electrostatic force. In certain embodiments, a plurality of upper chucks 1220 may be embedded in the bottom of the upper board 1210 such that the plurality of upper chucks 1220 are uniformly distributed over the upper board 1210 to hold the first substrate P1 using an electrostatic force.

A camera 1230 may be provided at the upper chamber 1200 to adjust the relative positions between the first substrate P1 and a second substrate P2. A substrate separation device 1240 may suction or pressurize the first substrate P1 such that the first substrate P1 is fixed to or separated from the upper chuck 1220.

The camera 1230 may observe an alignment state of the first substrate P1 and the second substrate P2, which will be described later, through a through-hole 1231 formed in the upper chamber 1220 and the upper board 1210. The camera 1230 may observe alignment marks (not shown) provided at the first substrate P1 and the second substrate P2 while overlapping the first substrate P1 and the second substrate P2. In alternative embodiments, the camera unit 1230 may observe at least two diagonal corners of the first substrate P1 and the second substrate P2 while overlapping the first substrate P1 and the second substrate P2. An illumination device 1330 may be installed at the bottom of the lower chamber 1300 to provide illumination to the camera 1230 such that the camera 1230 can photograph the alignment marks.

The substrate separation device 1240 may include a plurality of pins 1241 extending through the upper chamber 1200 and the upper board 1210, and a actuating member 1242 disposed at the outside of the upper chamber 1200 to move the separation pins 1241 upward or downward. Each pin 1241 may be formed in the shape of a hollow pipe. In each pin 1241, a vacuum pressure may be created to suction and hold the first substrate P1.

Also, although not shown, a vacuum pump may be connected to create the vacuum pressure in the bonding space defined between the upper chamber 1200 and the lower chamber 1300. The vacuum pump may be, for example, a dry pump, a turbo molecular pump (TMP), a mechanical booster pump (MBP), or other type of pump as appropriate.

The upper chamber 1200 may be moved toward the lower chamber 1300 by the driver 1400 such that the bonding space is defined between the upper chamber 1200 and the lower chamber 1300. A lower board 1310 may be disposed at the top of the lower chamber 1300. A lower chuck 1320 may be disposed at the top of the lower board 1310. The second substrate P2 may be held by the lower chuck 1320. The lower chuck 1320 may be an electrostatic chuck (ESC) that holds the second substrate P2 using an electrostatic force. A sealing member 1340 may be provided at the edge of the lower chamber 1300 to contact the bottom of the upper chamber 1200 such that the bonding space is airtightly sealed.

A substrate movement device 1350 may be provided at the bottom of the lower chamber 1300 to fix the second substrate P2 to the lower chuck 1320 or to separate the second substrate P2 from the lower chuck 1320.

The substrate movement device 1350 may include a plurality of pins 1351 extending through the lower chamber 1300 and the lower board 1310, and an actuating member 1352 disposed at the outside of the lower chamber 1300 to move the pins 1351 upward or downward.

When the second substrate P2 is supplied into the bonding space defined between the upper chamber 1200 and the lower chamber 1300, the pins 1351 may be raised to support the second substrate P2, and then lowered to locate the second substrate P2 on the lower chuck 1320. Also, when the bonded substrates P1 and P2 are to be withdrawn from the bonding space after the bonding process is completed, the pins 1351 may raise the bonded substrates P1 and P2 from the lower chamber 1300.

The driver 1400 moves the upper chamber 1200 toward the lower chamber 1300 such that the bonding space is defined between the upper chamber 1200 and the lower chamber 1300.

Figure 10:
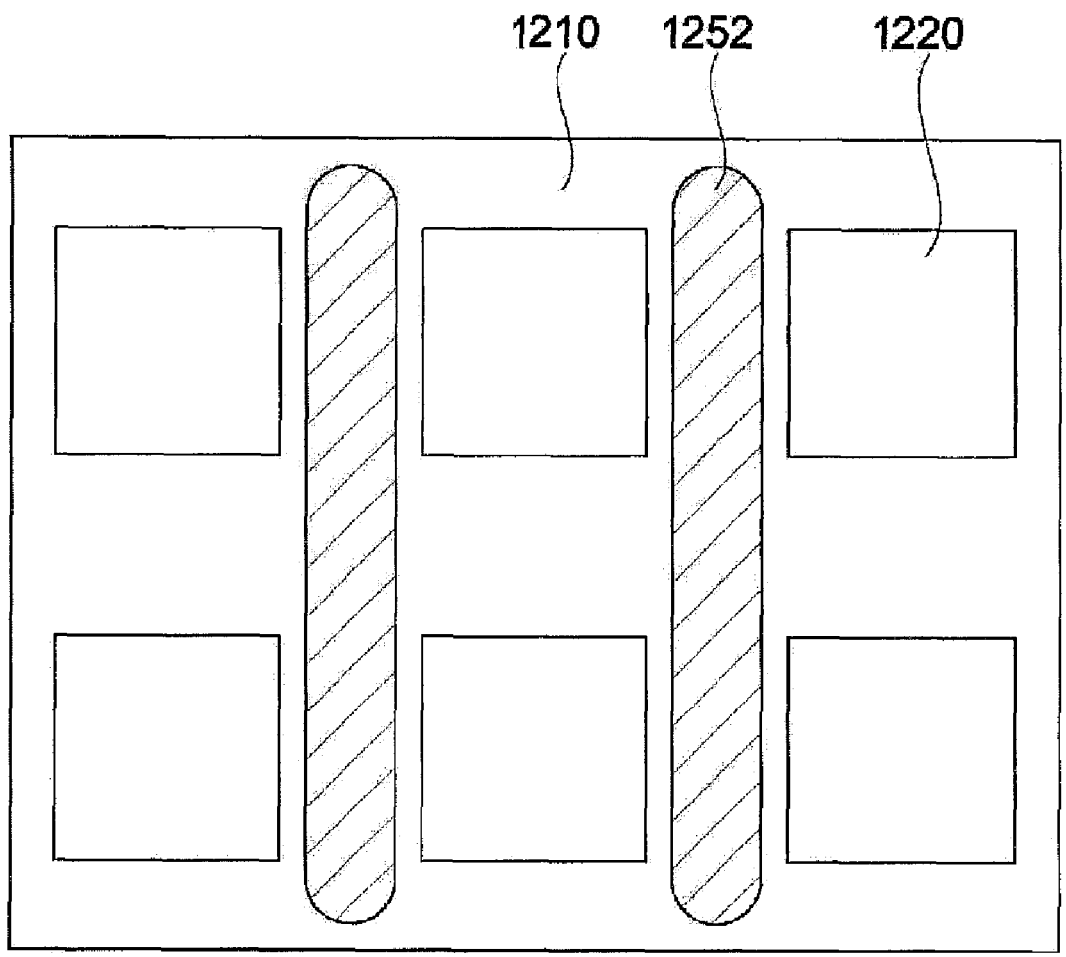
FIG. 10 is a plan view of electrostatic chucks arranged on a board as embodied and broadly described herein.
Figure 11:
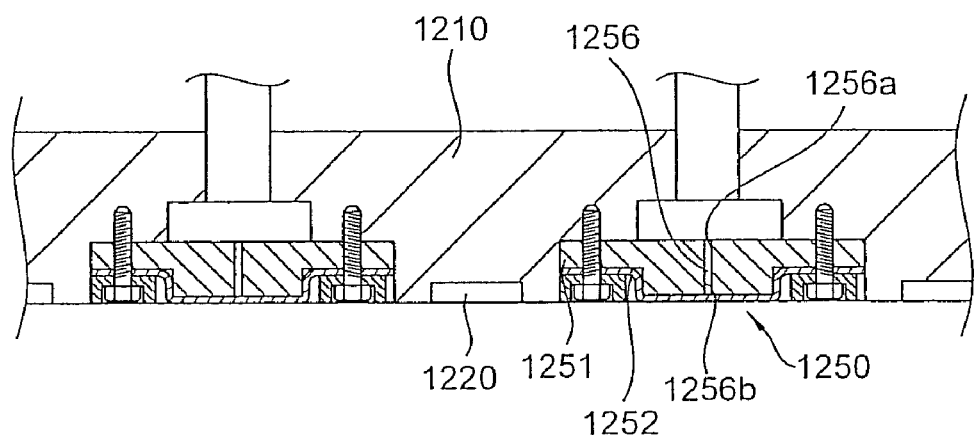
FIG. 11 is a front sectional view of an interior structure of the electrostatic chucks and the upper board shown in FIG. 10.
Figure 12:
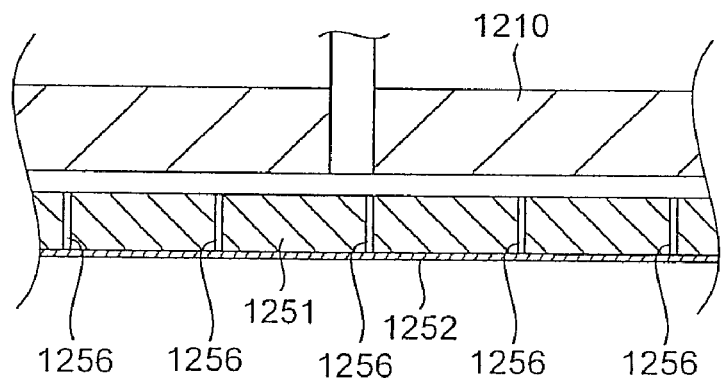
FIG. 12 is a side sectional view of the upper board shown in FIG. 10.

FIG. 10 is a plan view of electrostatic chucks and an upper board according to another embodiment as broadly described herein, FIG. 11 is front sectional view of an interior structure of the electrostatic chucks and the upper board shown in FIG. 10, and FIG. 12 is side sectional view of the upper board shown in FIG. 10.

Referring to FIGS. 10 to 12, a plurality of electrostatic chucks 1220 may be disposed on the upper board 1210 in a matrix fashion. This matrix arrangement of the electrostatic chucks 1220 may improve conveniences in maintenance and repair. Furthermore, suctioning of the first substrate P1 using a plurality of electrostatic chucks 1220 may reduce deformation of the first substrate P1 as compared with a case of using a single electrostatic chuck. Also, it may be possible to reduce the amount of power used to suction the substrate as the result of a uniform distribution of electrostatic chucks 1220, thereby improving economy and efficiency.

The upper board 1210 may also include air expansion devices 1250 to supply air such that the first substrate P1 can be separated from the electrostatic chucks 1220 to achieve the bonding of the first substrate P1 and the second substrate P2.

The electrostatic chucks 1220 hold the first substrate P1 only using an electrostatic force. Electrostatic chucks 1220 may suction the substrate using, for example, a Coulombic force and a Johnsen-Rahbeck force generated in an insulation layer located between an electrode and the first substrate P1. The electrostatic chucks 1220 may be classified as polyimide type electrostatic chucks 1220 or ceramic type electrostatic chucks 1220.

Each air expansion device 1250 may include a base block 1251, an air supplier (not shown), and an expansion member 1252. Air may be supplied to the expansion member 1252 through a through-hole 1256 formed in the base block 1251. Also, when the air is pumped out of the through-hole 1256, the expansion member 1252 contracts to its original state, and the through-hole 1256 of the base block 1251 serves to prevent the deformation of the expansion member 1252, for example excessive contraction of the expansion member 1252. The air supplier supplies air to one side 1256a of the through-hole 1256, with the expansion member 1252 located at the other side 1256b of the through-hole 1256. The expansion member 1252 expands toward the substrate attached to the electrostatic chucks 1220.

The expansion member 1252 is not particularly restricted so long as the expansion member 1252 is made of a relatively soft material. For example, the expansion member 1252 may be a diaphragm. As shown in FIG. 10, the expansion members 1252 may be disposed between the electrostatic chucks 1220. Each expansion member 1252 may be formed in the shape of a bar extending along the bottom (coupling) surface of the upper board 1210. The bar type expansion members 1251 may be uniformly distributed along the bottom of the upper board 1210, and therefore, it is possible to more effectively separate the first substrate P1 from the electrostatic chucks 1220 as compared with point type separation mechanisms.

Because, the bonding space is under vacuum, the expansion members 1251 may expand toward the bonding space, in which the pressure is low, by the air supplied from the air suppliers. At the same time, the electrostatic force from the electrostatic chucks 1220 is interrupted, thus separating the first substrate P1 from the electrostatic chucks 1220. Since, in the embodiment shown in FIG. 10, the bar type expansion members 1251 are disposed between the electrostatic chucks 1220, the residual electrostatic force from the electrostatic chucks 1220 is destroyed when the first substrate P1 is separated from the electrostatic chucks 1220, and, in addition, the first substrate P1 is efficiently separated from the electrostatic chucks 1220. When the expansion of the expansion members 1251 and the interruption of the electrostatic force from the electrostatic chucks 1220 are simultaneously carried out, it is possible to more efficiently separate the first substrate P1 from the electrostatic chucks 1220.

In certain embodiments, a heat wire may be installed at the outside of each base block 1251, such as, for example, an air channel defined in the upper board 1210, such that the air can more quickly expand. The air is transmitted to the expansion members 1251 through the through-holes 1256 of the base blocks 1251, with the result that the expansion members 1251 expand, and therefore, the first substrate P1 is separated from the electrostatic chucks 1220.

Figure 13:
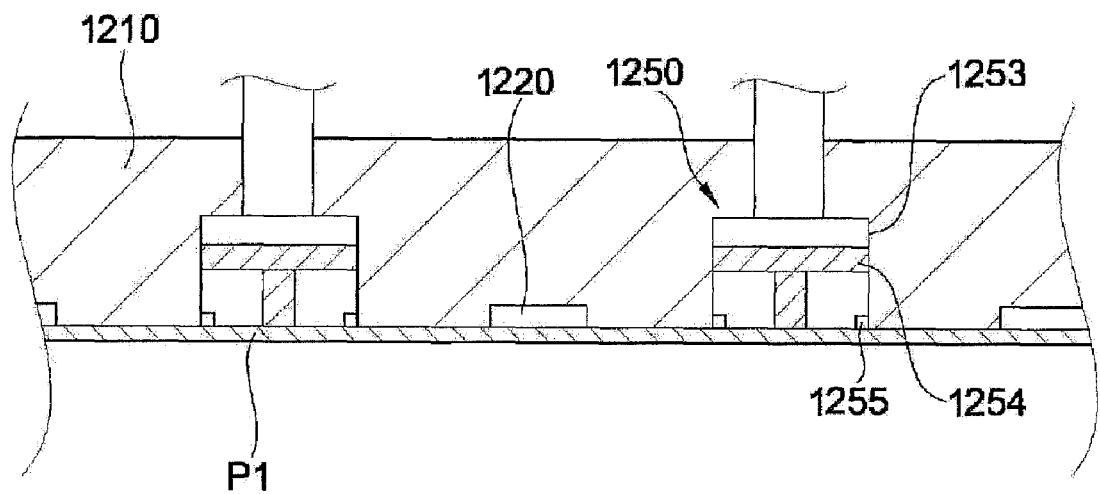
FIG. 13 is a front sectional view of an interior structure of an electrostatic chuck and an upper board in accordance with another embodiment as broadly described herein.

FIG. 13 is a front sectional view of an interior structure of an electrostatic chuck and an upper board according to another embodiment as broadly described herein, in which each air expansion device 1250 includes a cylindrical groove 1253, an air supplier (not shown), a piston 1254, and a catching protrusion 1255. The cylindrical groove 1253 may be formed in the upper board 1210. The air supplier supplies air to one side of the cylindrical groove 1253. The piston 1254 slides from one side to the other side of the cylindrical groove 1253. The catching protrusion 1255 supports the piston 1254 in the cylindrical groove 1253 at the bottom dead center of the cylindrical groove 1253.

Consequently, the supplied air causes the piston 1254 to slide, and the first substrate P1 is separated from the electrostatic chucks 1220 by the sliding movement of the piston 1254. At this time, the electrostatic force from the electrostatic chucks 1220 is interrupted, and therefore, the first substrate P1 is more easily separated from the electrostatic chucks 1220.

Hereinafter, the operation of the substrate bonding apparatus 1100 shown in FIG. 9 will be described.

First, the first substrate P1 and the second substrate P2 are supplied between the upper chamber 1200 and the lower chamber 1300 by a substrate supply apparatus (not shown). In particular, the first substrate P1 enters between the upper chamber 1200 and the lower chamber 1300, and the pins 1241 are lowered to suction and hold the first substrate P1. Subsequently, the pins 1241 raise the first substrate P1, and the first substrate P1 is attached to the electrostatic chuck 1220.

When the second substrate P2 is supplied, the pins 1351 disposed at the lower chamber 1300 are moved upward from the lower chamber 1300 by the respective actuating members 1352, and the second substrate P2 is supported by the upward-moving pins 1351. When the pins 1351 are moved downward by the respective actuating members 1352, the second substrate P2, supported by the pins 1351, is also moved downward and, the second substrate P2 is attached to the lower chuck 1320 by an attachment force of the lower chuck 1320.

When the attachment of the first substrate P1 and the second substrate P2 is completed, the upper chamber 1200 is moved toward the lower chamber 1300 by the driver 1400, and therefore, the bottom of the upper chamber 1200 is brought into tight contact with the top of the lower chamber 1300, thus defining a bonding space therebetween. At this time, an airtight seal is established between the upper chamber 1200 and the lower chamber 1300 by the sealing member 1340 disposed between the edges of the upper and lower chambers 1200 and 1300.

After the bonding space is defined, the alignment of the first substrate P1 and the second substrate P2 is carried out by an alignment device (not shown).

Figure 14:
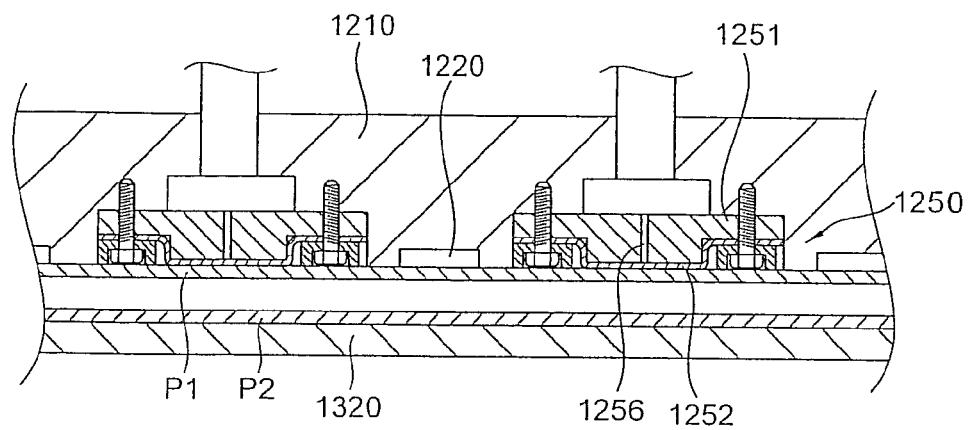
FIGS. 14 and 15 illustrate operation of the electrostatic chuck shown in FIG. 10 and the substrate bonding apparatus shown in FIG. 9.
Figure 15:
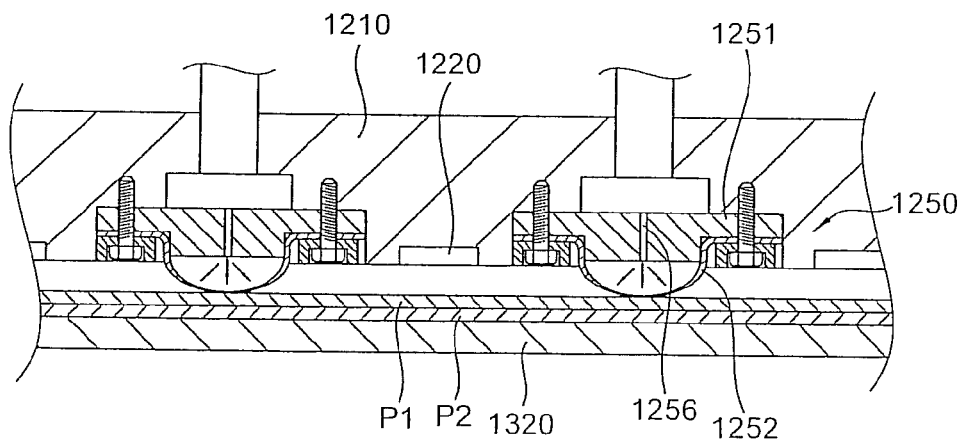

When the alignment is completed, vacuum pressure is created in the bonding space, and the first substrate P1 is moved into close proximity to the second substrate P2 (See FIG. 14). Subsequently, the expansion members 1252 are expanded as shown in FIG. 15. As a result, the first substrate P1 is separated from the electrostatic chucks 1220, and the first substrate P1 freely drops to the top of the second substrate P2 such that the first substrate P1 is temporarily bonded to the second substrate P2 (See FIG. 15).

Specifically, the air suppliers supply air into the respective base blocks 1251, and the expansion members 1252 are expanded by the air supplied into the respective base blocks 1251. Since the bonding space is under vacuum, the expansion members 1251 are expanded toward the bonding space, in which the pressure is low, by the air supplied from the air suppliers. At the same time, the electrostatic force from the electrostatic chucks 1220 is interrupted, with the result that the first substrate P1 is separated from the electrostatic chucks 1220, and the first substrate P1 is temporarily bonded to the second substrate P2.

Pressure is applied to an assembly of the temporarily bonded first and second substrates P1 and P2, while an $N_2$ process gas is supplied to the bonding space surrounding the temporarily bonded first and second substrates P1 and P2, such that the first substrate P1 and the second substrate P2 are securely bonded to each other. That is, the pressure difference between the inside and the outside of the temporarily bonded first and second substrates P1 and P2 is increased by increasing the pressure in the bonding space, with the result that the first substrate P1 is bonded to the second substrate P2.

When the bonding of the first substrate P1 and the second substrate P2 is completed, the pressure in the bonding space is restored to atmospheric pressure conditions, and the bonded substrates P1 and P2 are withdrawn from the substrate bonding apparatus 1100. The pressure in the bonding space is restored to atmospheric pressure because it is easy to control the pressure, and a subsequent substrate withdrawal is performed at the atmospheric pressure, whereby an additional process is not necessary.

As apparent from the above description, the present invention is capable of separating the substrate held by the chucking members from the chucking members.

A substrate bonding apparatus is provided that is capable of separating a substrate held by chucking members from the chucking members.

A substrate bonding apparatus as embodied and broadly described herein may include a board having one major surface opposite to a substrate fixed at one side thereof, a plurality of chucking members located between the one major surface of the board and the substrate for holding the substrate, and a substrate separation unit to separate the substrate from the chucking members.

The substrate separation unit may include a pusher for pushing the substrate to separate the substrate from the chucking members and a base plate installed at the one major surface of the board, the base plate having an installation space to install the pusher formed therein. The pusher protrudes out of the base plate through an inlet and outlet port located at one end of the installation space to pressurize the substrate.

The chucking members may be disposed around the inlet and outlet port.

The substrate separation unit may also include an elastic member to provide a restoring force to the pusher protruded out of the base plate.

The substrate separation unit may also include a diaphragm expandable, by gas supplied from the outside, to pressurize the pusher.

The substrate separation unit may also include a piston to pressurize the pusher, and the piston includes a piston rod, a cover to cover the top and the side of the pusher, and a push part disposed in the cover in contact with the top of the pusher.

An O-ring may be installed between the side of the pusher and the inside of the cover.

The substrate separation unit may include an expansion member disposed between the chucking members such that the expansion member is expanded by gas supplied from the outside to pressurize the substrate.

The substrate separation unit may also include a base block having a through-hole and a gas supplier to supply the gas to one side of the through-hole, and the expansion member is located at the other side of the through-hole, the expansion member being fixed to the base block at one side and the other side thereof.

The expansion member may be formed in the shape of a bar extending substantially parallel to the one major surface of the board.

The substrate separation unit may include a gas supplier to supply gas to one end of a cylindrical groove formed at the board and a piston disposed in the cylindrical groove for moving toward the open other end of the cylindrical groove by the gas to pressurize the substrate.

The board may include a catching protrusion formed at the inner circumference of the cylindrical groove to prevent the separation of the piston from the cylindrical groove.

Any reference in this specification to "one embodiment," "an embodiment," "example embodiment," "certain embodiments," "alternative embodiments," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A substrate bonding apparatus, comprising:
    a board having a receiving surface that receives a substrate fixed thereto;
    a plurality of chucking members provided with the receiving surface of the board, wherein the plurality of chucking members hold a mating surface of the substrate on the receiving surface of the board; and
    a substrate separation device that selectively separates the substrate from the plurality of chucking members to release the substrate from the board, wherein the substrate separation device includes at least one expansion device positioned between adjacent chucking members on the board, wherein the at least one expansion device includes:
        a base block fixed in a recess formed in the receiving surface of the board; and
        an expansion member coupled to the base block such that the expansion member is positioned between the base block and the substrate fixed to the receiving surface of the board, wherein, in a deflated state, the at least one expansion device and the plurality of chucking members form a substantially planar surface on which the substrate is received, and wherein, in an inflated state, the expansion member is inflated by air received therein via the base block such that a space between the base block and the expansion member is filled with air and the inflated expansion member applies a corresponding pressure to the substrate so as to separate the substrate from the board.

2. The substrate bonding apparatus of claim 1, wherein the substrate separation device includes:
    a pusher that pushes on the mating surface of the substrate; and
    a base plate installed on the receiving surface of the board, the base plate having an installation space in which the pusher is received, wherein the pusher extends out of the base plate through a port provided at an open end of the installation space so as to apply pressure to the substrate to release the substrate from the board.

3. The substrate bonding apparatus of claim 2, wherein the substrate separation device includes an elastic member that provides a restoring force, wherein the restoring force restores the pusher from an extended position out of the installation space back to a retracted position within the installation space.

4. The substrate bonding apparatus of claim 1, wherein the expansion member is fixed to the base block at opposite ends thereof, and wherein the base block has a through-hole formed therein, wherein air is supplied to a first end of the through-hole from an external source and the through hole conveys the air from the first end to the expansion member positioned at a second end of the through-hole so as to inflate the expansion member.

5. The substrate bonding apparatus of claim 1, wherein the expansion member is formed in the shape of a bar that extends substantially parallel to the receiving surface of the board.

6. The substrate bonding apparatus of claim 5, wherein the board includes a catching protrusion formed at an inner circumferential portion of an open end of a cylindrical groove, wherein the catching protrusion prevents separation of the piston from the cylindrical groove.

7. The substrate bonding apparatus of claim 4, wherein, in a deflated state, air received in the inflated expansion member is discharged through the through hole to deflate the expansion member and re-position the expansion member against the base block.

8. The substrate bonding apparatus of claim 1, wherein the at least one expansion device comprises a plurality of expansion devices positioned between adjacent rows or adjacent columns of chucking members on the board.

9. The substrate bonding apparatus of claim 8, wherein the plurality of expansion devices are arranged in parallel.

* * * * *